March 25, 1941.  C. G. WRIGHT  2,236,205
BELT CONVEYER
Filed Feb. 16, 1939
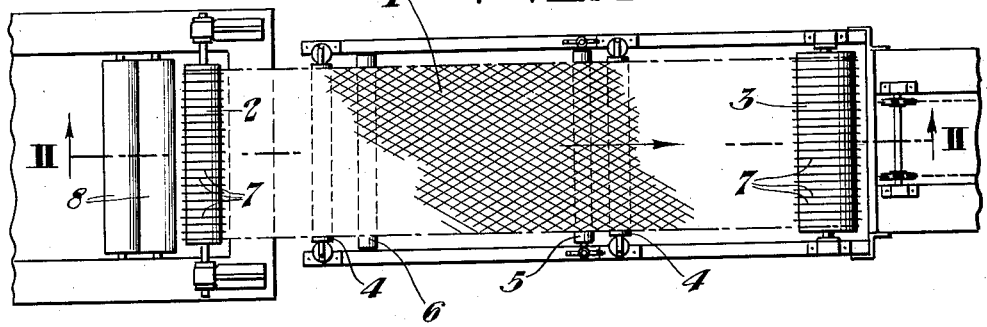
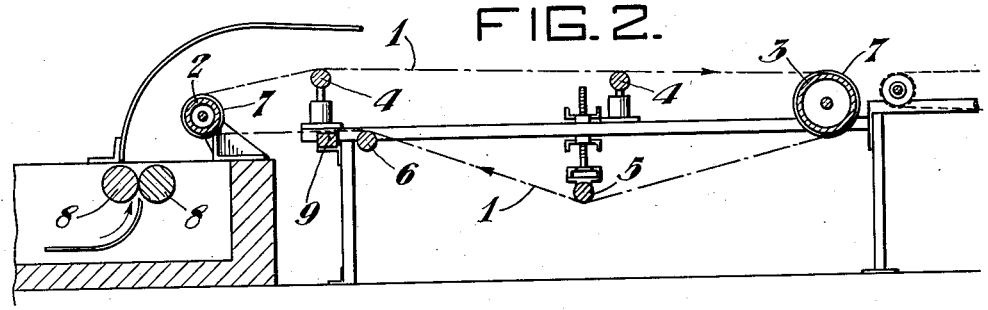
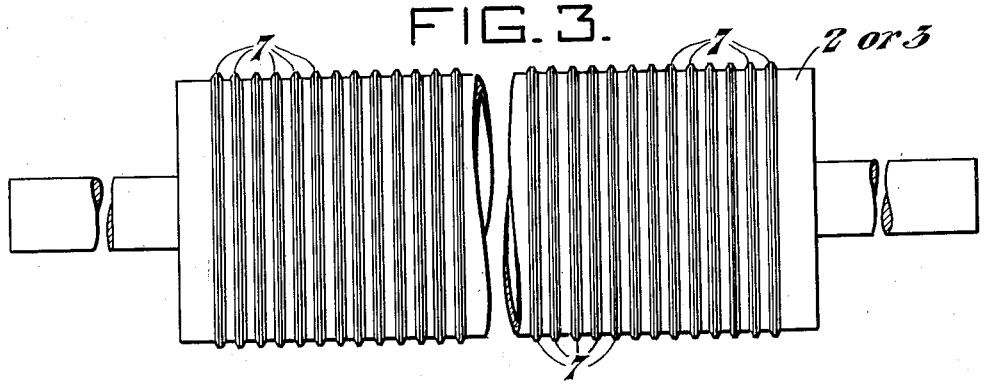
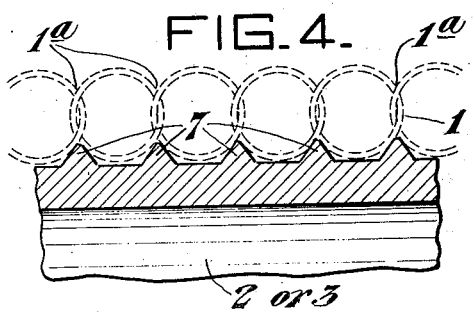
Inventor:
CARL GUSTAVE WRIGHT,
by: John E. Jackson
his Attorney.

Patented Mar. 25, 1941

2,236,205

UNITED STATES PATENT OFFICE 2,236,205

BELT CONVEYER

Carl Gustave Wright, Cambridge, Ohio

Application February 16, 1939, Serial No. 256,815

2 Claims. (Cl. 198—203)

This invention relates to belt conveyers using a belt of parallel intermeshed wire coils or a similar type of belt, one of the objects being to prevent this belt from shifting laterally on the necessary drums which it rides.

A specific example of the invention is illustrated by the accompanying drawing in which:

Figure 1 is a plan of a conveyer embodying the principles of the invention;

Figure 2 is a vertical section taken from the line II—II in Figure 1;

Figure 3 is an enlargement of a detail; and,

Figure 4 is a sectional enlargement showing in detail the construction of the detail shown by Figure 3.

More specifically, the drawing shows a conveyer having an endless belt 1 of the type mentioned. That is to say, this belt is made of a series of parallel intermeshed wire coils. The belt passes around a driving drum 2 and a driven or idling drum 3, rollers 4 supporting the top span of the belt to maintain its contour under the weight of the articles carried. Tautness of the belt is obtained by a tightening roller 5 adjustably mounted to apply pressure to the belt as required to deflect it sufficiently to produce the desired tautness. This roller 5 works on a span of the belt between the drum 3 and a roller 6.

The belt 1 inherently provides laterally spaced, longitudinally extending depressions 1ª, these being provided by the intermeshing portions of the belt coils. The present invention takes advantage of these depressions, the drums 2 and 3 being provided with a plurality of circumferential ridges 7 mutually spaced distances at least approximately equaling the distances between the intermeshing portions of the belt coils taken transversely of the belt. When the conveyer is operating, these ridges 7 enter the longitudinally extending depressions 1ª of the belt and positively prevent the latter from shifting laterally on these drums. The portions of the coils between their intermeshing portions nestle between these ridges.

One advantage of the invention is that it is unnecessary to maintain the extremely close tolerances required when a sprocket drum is used with a belt of the type under consideration. This follows from the fact that even in the case of a belt having flattened coils, the intermeshing portions of the various coils curve toward the portions therebetween, whereby to provide guiding surfaces effecting registration with the ridges 7 on the drums. Furthermore, damage to the mesh pattern causes no trouble, there being no sprocket teeth which must register with the mesh openings.

The conveyer is illustrated as carrying galvanized sheets leaving a galvanizing machine generally designated by the numeral 8. The advantages of the invention are particularly great when applied to this use because contamination of the belt by spelter causes no trouble at the drums, the ridges 7 performing their function properly at all times, whereas a sprocket drum is subject to the difficulty of the belt tending to rise and creep laterally when the mesh openings become filled with the spelter. The conveyer is shown as provided with a cleaning brush 9 which functions to clean the belt, but it is undesirable to absolutely rely on this arrangement to positively keep the mesh opened.

I claim:

1. A conveyer including the combination of a belt of the parallel intermeshed wire coil type and a drum on which said belt rides and which has circumferential substantially continuous ridges entering the depressions formed in said belt by the intermeshed portions of its coils.

2. A conveyer including the combination of a belt of the parallel intermeshed wire coil type and a drum on which said belt rides and which has circumferential substantially continuous ridges entering the depressions formed in said belt by the intermeshed portions of its coils, said ridges being spaced laterally of said drum distances in accordance with the distances between the intermeshing portions of the coils of said belt taken transversely of the latter and preventing said belt from shifting laterally of said drum.

CARL GUSTAVE WRIGHT.